United States Patent
Son

[15] 3,702,619
[45] Nov. 14, 1972

[54] IN-LINE MIXING APPARATUS FOR GASES

[72] Inventor: Jaime S. Son, El Cerrito, Calif.

[73] Assignee: Shell Oil Company, New York, N.Y.

[22] Filed: Jan. 28, 1971

[21] Appl. No.: 110,494

[52] U.S. Cl. .................137/3, 137/88, 137/90, 137/604, 239/427.5, 239/430, 259/4
[51] Int. Cl................................................F16k 19/00
[58] Field of Search.............137/1, 4, 88, 604, 3, 90; 48/180 C, 180 P; 259/4; 239/112, 427.3, 427.5, 430

[56] References Cited

UNITED STATES PATENTS

| | | | |
|---|---|---|---|
| 516,107 | 3/1894 | Pemberton | 239/427.5 |
| 2,417,445 | 3/1947 | Pinkel | 239/427.5 |
| 1,232,921 | 7/1917 | Hicks | 239/427.5 |
| 3,128,994 | 3/1964 | Hungate | 137/604 X |

Primary Examiner—Robert G. Nilson
Attorney—H. W. Haworth and H. C. Geller

[57] ABSTRACT

A first gaseous stream is rapidly dispersed into a second flowing gaseous stream in an inline mixing apparatus comprising a mixing zone containing (a) an inlet for the introduction into said mixing zone of the second gaseous stream at one end of the zone; (b) a gas velocity- and static pressure-stabilizing zone downstream from the inlet; (c) downstream from the gas velocity- and static pressure stabilizing zone at least one sparging means having a plurality of uniformly distributed orifices on its downstream surface for the injection of the first gaseous stream into the second flowing gaseous stream, any successive sparging means having a smaller diameter than the means located upstream thereof; and (d) an outlet for the resulting mixed first and second gases from the mixing zone.

5 Claims, 2 Drawing Figures

INVENTOR:
J. S. SON
BY: Howard W Haworth
HIS ATTORNEY

IN-LINE MIXING APPARATUS FOR GASES

BACKGROUND OF THE INVENTION

Many industrial processes require the mixing of large quantities of two or more gases which are subsequently fed to a chemical reactor. It is desirable in most cases to mix the reactants completely before their introduction into the chemical reactor, if losses in selectivity and conversion are to be avoided.

Mixing of this type is often employed in oxidation processes, for instance in the preparation of acetaldehyde from methane, ethylene, and ethanol; acetaldehyde and acetic acid from ethane; isopropanol and acetone from propane; methanol, formaldehyde and acetaldehyde from butane; ethylene oxide from ethylene; and phthalic and maleic anhydrides from o-xylene, naphthalene, or benzene. In these processes, the two gaseous streams are mixed in the desired ratio and subsequently passed to a reactor, where a catalytic or thermal conversion is effected. The oxidation reactor's conditions are carefully controlled so as to maximize the desired product (s) and avoid yield losses to by-products, such as carbon dioxide and water.

In general, the design of an apparatus that will completely mix two or more gases is not difficult. The design and fabrication, however, become quite complicated if (1) a certain range of concentrations of the two gases is flammable or explosive and (2) the flow rates of the gas streams vary during operation as a result of start-up, shut-down, or upset conditions in a downstream chemical reactor. If operating safety is to be guaranteed, fixed, as well as operating, costs can be high.

In conventional oxidation processes, an oxygen-containing gas is mixed with the organic substrate by injection through multiple tubes into a flowing stream of the substrate. It is desirable to disperse the oxygen-containing gas as rapidly as possible since high, local oxygen concentrations may result in detonable mixtures. The exact, dangerous oxygen concentrations depend on the composition, temperature, and pressure of the gas mixture, and can be calculated from empirical formulas. Another requisite for safe operation is prevention of any organic substrate flowing back to the oxygen inlet because, in general, organic substrate concentrations in oxygen greater than about 0.2 to about 1 percent are considered flammable. Finally, in cases where several chemical reactors are arranged in parallel, mixing must be complete prior to stream division. In practice, the oxygen concentration of the mixture fed to a reactor will be near the flammable limit to obtain maximum conversion. Hence, if mixing is not complete before division of the stream, one of the divided streams may have a concentration higher than the flammable limit.

BRIEF SUMMARY OF THE INVENTION

It has now been found that rapid dispersion is obtained and back-flow is substantially avoided in a mixing apparatus by injecting one gas into another flowing gas at a number of points along a uniform, substantially cylindrical gas conduit through a plurality of orifices located on the downstream surface of a least one sparging means. The sparging means are mounted concentrically over a length of gas conduit upstream of which the static pressure and velocity distributions become substantially uniform. In a preferred embodiment, such a condition of uniformity can be obtained at a relatively short distance, namely about 3 to about 11 conduit diameters downstream of a 90° elbow which has a radius to diameter ratio approximately equal to one. In other preferred embodiments, at least two ring-shaped sparging means are employed, wherein the flow of gas to each is independently controllable, and the diameter of each ring-shaped sparging means downstream of the first is smaller than the one immediately upstream thereof.

DESCRIPTION OF THE PREFERRED EMBODIMENTS

I. Mixing

Figure 1:
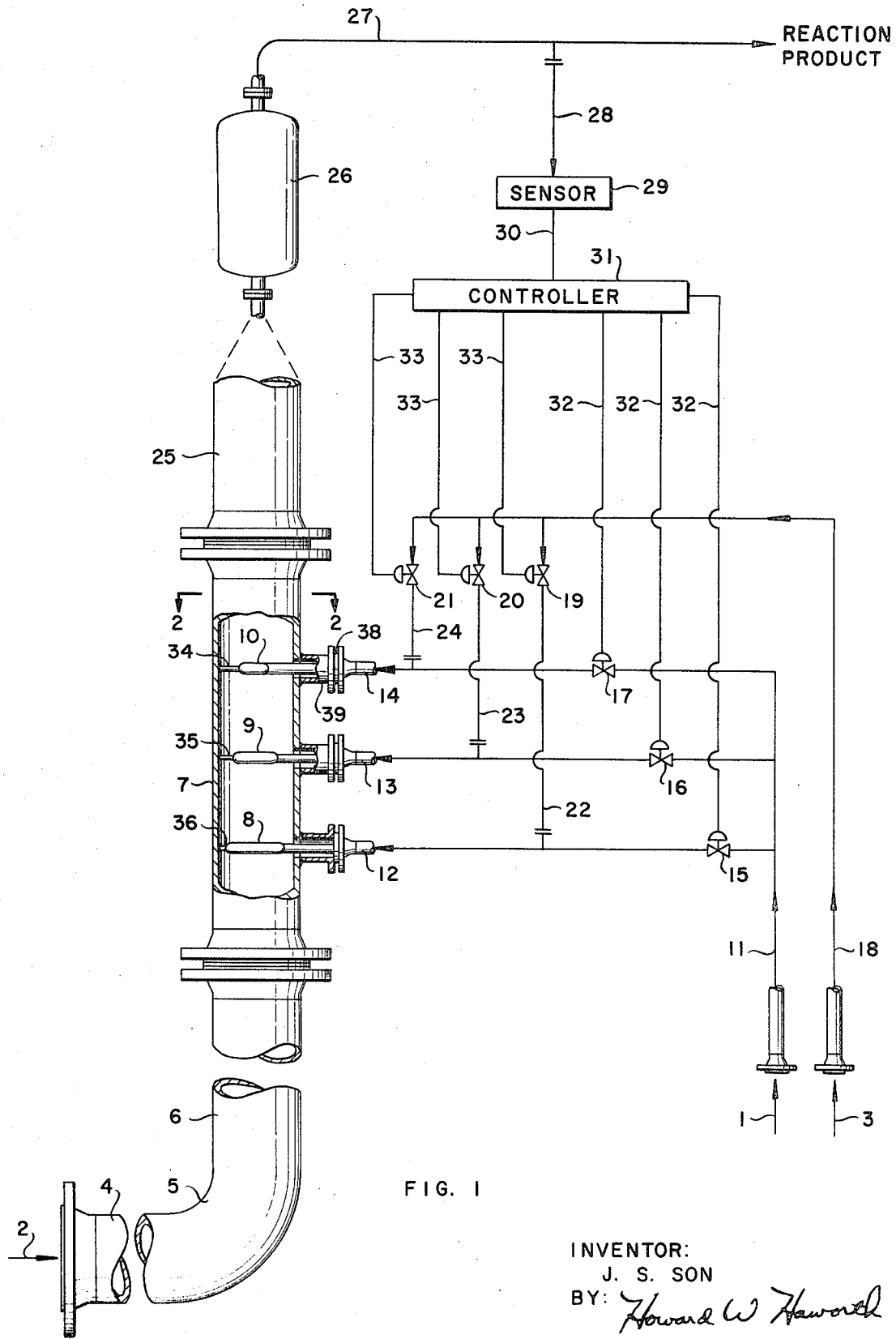
FIG. 1 shows a partially schematic view of a preferred embodiment of the mixing apparatus of the present invention.

Rapid mixing of two gas streams can be obtained by injecting one of the gas streams, designated as the first stream, into a relatively slower second stream flowing inside a mixing zone. In practice, the first stream is usually injected through multiple nozzles, which reduces the distance required for the gases to completely mix.

The higher the difference in velocity between the first and second gaseous streams, the faster will be the transfer of momentum and mass across the pipe and hence, the shorter the mixing distance required. If the flow of first gas may reasonably be expected to change, the mixing nozzle must be sized for the smallest difference in velocity between the two streams. The extreme case is where the two velocities are equal and diffusion of material depends only on the zone turbulence. However, even if the flow rate of the first stream varies, a substantial difference in velocity between the two gas streams can be achieved if the total number of injecting orifices or nozzles can be varied. This is one of the principal features of the inline mixing device described hereinafter.

II. Fluid Distribution

Multiple injection requires careful design of the sparging means to insure nearly equal flow of the injected material through all the nozzles or orifices. Such a condition can only be obtained by proper balances of pressures and velocities of the two gas streams. For a sparging means which is submerged in a static fluid, this condition can be obtained without too much difficulty. However, when the second fluid is flowing, additional fluid mechanical problems arise, either because of the geometry of the zone in which the second fluid is flowing, or because of the geometry of the sparging means, which alters the velocity and static pressure distributions.

In the inline mixing apparatus of the present invention, the additional fluid mechanical problem caused by the motion of the second fluid is minimized. This is accomplished by first, providing a gas velocity- and static pressure-stabilizing zone upstream of the sparging means and from which the second gas flows with uniform velocity and pressure distributions and secondly, by designing the sparging means so that it introduces the same changes in the velocity and pressure distribution around each orifice or nozzle of the same sparging means, thus insuring that that the static pressure and velocity in the vicinity of each orifice will be nearly the same. This is achieved by injecting a first gaseous stream through multiple orifices located in at least one sparging means mounted concentrically over a length of gas conduit, upstream of which the velocity and static pressure distributions are uniform.

The pressure outside the orifice is important because it affects the rate of flow of fluid from the sparging means. The relationship between the flow rate and the pressures is commonly given by equation (I):

$$q = C_o A_o \sqrt{2g_c(P_i - P_o)/\rho} \qquad (I)$$

where, for a ring-shaped sparging means, $A_o$ = area of orifice
$q$ = secondary gas flow through an orifice
$C_o$ = orifice coefficient
$P_i$ = static pressure within sparging means near the orifice
$P_o$ = pressure just outside the orifice
$\rho$ = gas density.

Equal distribution of the discharged fluid from the ring manifold can only be obtained by proper balances of pressures and velocities.

If the variation in $P_o$ is very small compared to the orifice pressure drop ($P_i - P_o$), equal flow of the discharged fluid can be obtained by properly sizing the sparging means tube diameter, the total orifice area, and the distance between the orifices. The fluid pressure $P_i$ within the sparging means changes due to wall friction and to the changing fluid momentum. The wall friction tends to make the pressure fall, while the decrease of velocity inside the sparging means, as successive portions of the stream leaves, increases the sparging means fluid pressure. If the ratio of the sparging means tube-diameter and the total orifice flow area is such that the kinetic energy of the inlet stream to the ring-shaped sparging means and the friction loss in the sparging means are both less than about 10 percent of the orifice pressure drop, then the maldistribution of flow is less than ±5 percent. This percentage of maldistribution in the flow of gas from each orifice has proven acceptable.

If the flow of the first stream varies over a wide range of flow rates, the sparging means can be designed to equally distribute the first gas stream at all flow rates only if very high velocities or large pressure drops can be tolerated at the high flow rates. This difficulty can be avoided by providing some method for varying the total number of orifices or nozzles, and is accomplished in the inline mixing apparatus of the present invention by including at least two sparging means, which are independently supplied with the first gaseous stream.

Preferably, the sparging means are ring-shaped, have the same general shape, and are of different sizes and different total orifice flow areas. Thus, at low flow conditions only the orifice flow area which is needed to provide the desired flow of first gas is activated. By this selective reduction or expansion in orifice flow area, the sparging means remaining in service can be forced to operate near their design conditions. This insures the maintenance of a substantial velocity difference between the first and second gaseous streams, while at the same time avoiding the need for a concurrently introduced inert purge gas to prevent backflow of the second gaseous stream into the sparging means and their manifold system.

A difficulty with this arrangement is that the secondary gaseous stream will backflow into sparging means which have been deactivated. If some percentage combination of the mixture is flammable, a hazardous condition can exist. This can be prevented by purging a sparging means after it is taken out of service with a slug of an inert gas to clear the first gas therein and then to purge it again with a slug of the inert gas before the sparging means is reactivated to clear the second gas. The flow rate of the purge gas must be sufficient to prevent backflow of the second gaseous stream into the sparging means during the purging. The duration of the purging must also be long enough to clear the sparging means completely. A total purge gas volume equivalent to several volumes of the sparging means is generally sufficient to accomplish this.

III. Uniform Velocity and Static Pressure Distributions

Pipe flow with uniform velocity and static pressure distributions is difficult to obtain unless special inlet and flow straightening devices are used. Both require special design and fabrication techniques. However, a few percent maldistribution in velocity and a small variation in the static pressure distribution can be tolerated at the expense of the higher orifice pressure drop required to insure uniform flow through all the orifices and higher flow rate of inert gas needed for purging when a sparging means is shut down. Such a condition can be obtained through utilization of a gas velocity- and static pressure-stabilizing zone. Conventional methods are available for maximizing the uniformity of the gas velocity and static pressure. In general, these methods comprise temporarily altering the flow of gas and subsequently allowing it to pass undisturbed through a substantially cylindrical conduit. The flow of gas is altered by one of two general techniques: either by (1) increasing its velocity, such as by decreasing, in the direction of flow, the cross sectional area of the conduit in which the gas flows, for example, in a converging transition zone, or (2) by adding a resistance to flow, for instance, by placing at least one baffle or one perforated partition, for example, a screen, a honeycomb, and the like, in the gas flow path. The length of cylindrical conduit downstream of the flow altering means is principally dependent upon the degree to which the flow of gas has been altered. In general, lengths of conduit varying from about 3 to about 20 diameters of the gas velocity- and static pressure-stabilizing zone are adequate.

In a preferred modification, stability of the gas velocity and static pressure is achieved by subjecting the second gas flow to a resistance to flow which comprises passing it through an elbow, whereby its direction of flow is changed from about 5° to 180°. In an especially preferred embodiment, the direction of flow is changed by about 90°. In practice, this can be accomplished by utilization of an elbow of approximately 90° in which the radius to diameter ratio of the ring-angle elbow is about 1:1, but may vary from about 1 to 1 to about 20 to 1. By radius to diameter ratio is meant the ratio of radius of curvature of the elbow to the internal diameter of the elbow.

The optimum placement of the sparging means downstream of the right angle elbow is determined by two factors. One consideration is the establishment of uniform velocity and static pressure profiles before the injection of the first gaseous stream into the second. This factor sets the minimum distance between the elbow and the first sparging means downstream thereof. Generally it has been found that a straight length of conduit, at least 3 conduit diameters long, permits the development of substantially uniform flow conditions in the flowing second gaseous stream. This distance is not inflexible and may vary with such factors as the radius to diameter ratio of the elbow and the Reynolds number associated with the second gaseous stream.

The maximum downstream distance of the sparging means will depend upon the outside diameter of the gas conduit and the juxtaposition of the mixing device to nearby equipment. The first sparging means should generally be located no more than about 11 gas conduit diameters downstream of the right angle elbow. It has been found that the optimal location for the sparging means is about 5 to about 7 gas conduit diameters downstream from the right angle elbow.

The portion of the mixing apparatus in which the sparging means are located will generally have the same diameter as the cylindrical conduit immediately upstream thereof.

IV. Use of Multiple Sparging Means

If the chemical process downstream of the mixing apparatus can be expected to operate at a relatively steady state, only one sparging means need be present within the gas conduit. Generally, however, this ideal condition will not prevail, as chemical converters experience periods of upset, and invariably must be shut down for periodic inspection and maintenance, and must thereafter be started up. Under such varying conditions, it will be necessary to vary the flow of gaseous reactants. In the mixing apparatus of the present invention, it is accordingly preferable to have at least two sparging means within the gas conduit, which sparging means have different sizes and different orifice areas. The sizes of such sparging means will depend, first of all, on the normally expected throughput of the reactor, and secondly, on the normally expected variations in that throughput, i.e., from no flow of gases to be mixed to a flow corresponding to full throughput.

When more than one sparging means is present within the mixing apparatus of the present invention, it is desirable to have each successively-located, downstream sparging means smaller than the one immediately upstream thereof. For a ring-shaped sparging means, this is accomplished by employing successively smaller diameter rings, and perhaps, constructing each successive ring-shaped sparging means from a smaller diameter tube. By employing successively smaller sparging means downstream of the first, the static pressure and velocity profiles of the mixing gases experience a minimum of maldistribution. Preferably, the distance between any two sparging means is greater than about 6 ring tube diameters. Such spacing permits any disturbances in the static pressure and velocity profiles which occur as the mixing gases flow past upstream sparging means to be smoothed out.

By the use of multiple sparging means and suitable manifolding, the flow of the first gas fed to each sparging means is made independently controllable. Conditions prevailing in the downstream chemical reactor and/or the effluent therefrom may be monitored, for example, by suitable temperature-, pressure-, and composition-measuring instruments, with appropriate correction signals being transmitted to control valves in lines through which the first gas passes to the various sparging means. The manifolding will ordinarily contain valving through which an inert or purge gas, for example, nitrogen, argon, carbon dioxide or their mixtures, may be admitted to each sparging means upon activation or shutting down. Valving controlling the flow of purge gas is also controlled by downstream process conditions.

V. Gases Mixed

The mixing apparatus of the present invention may be employed to form uniform compositions of gaseous feeds for a wide variety of downstream unit processes. Representative of such unit processes are combustion, oxidation, nitration, esterification, reduction, amination, halogenation, oxyhalogenation, sulfonation, hydration, dehydration, hydrogenation, dehydrogenation, alkylation, condensation, polymerization, pyrolysis, aromatization, isomerization, acylation, hydroformylation, and carboxylation. A preferred use of the mixing apparatus of the present invention is in the preparation of feeds for the thermal and catalytic oxidation of organic substrates.

A wide variety of organic substrates, in gaseous form, may be mixed with an oxygen-containing gas in the apparatus of the present invention. Suitable organic substrates include methane, ethylene and ethanol as precursors for acetaldehyde; ethane for conversion to acetaldehyde and acetic acid; propane as a starting point for isopropyl alcohol and acetone; and butanes as precursors for formaldehyde and acetaldehyde. After mixing with an oxygen-containing gas, as hereinabove described, benzene, o-xylene, and naphthalene are suitably converted to phthalic and maleic anhydrides; butenes are converted to butadiene, and acrolein to acrylic acid by oxidative dehydrogenation; and cycloparaffins are converted to cyclic alcohols and carbonyls. Olefins are particularly well suited for mixing with an oxygen-containing gas in the apparatus of the present invention, and are suitably converted in a downstream chemical reactor to aldehydes, ketones, acids, dimeric dienes, and olefin oxides. The mixing apparatus of the present invention is especially useful for mixing ethylene and an oxygen-containing gas upstream of a chemical converter in which ethylene oxide is prepared.

When the mixing apparatus of the present invention is used in conjunction with a downstream oxidation process, the oxygen-containing gas may comprise oxygen, air, or oxygen in admixture with an inert gas, for example, nitrogen, argon, carbon dioxide, or their combinations. Preferably, the oxygen-containing gas constitutes the first gaseous stream, as hereinabove defined, which is injected through the sparging means into the organic substrate, which comprises the second flowing gaseous stream.

DETAILED DESCRIPTION OF THE DRAWINGS

Referring to the drawings, FIG. 1 shows a partially schematic view of a preferred embodiment of the mixing apparatus of the present invention. The apparatus comprises an inlet manifold 4 for the second gas stream 2; a 90° elbow 5; gas conduit section 6, which has a length of about three to 20 times its diameter, wherein uniform static pressure and velocity profiles develop in the second gas; mixing zone 7 where, for purposes of illustration, three ring-shaped sparging means 8, 9, and 10 are located. As depicted in FIG. 1, the gas velocity- and static pressure-stabilizing zone comprises elbow 5 and conduit section 6. The first gas flowing in sparging means feed lines 12, 13, and/or 14 pass through inlet flanges 38 (held in place by sparger mounting nozzles 39) and sparging means inlet lines 37 to sparging means 8, 9, and/or 10, respectively. Sparging means 8, 9, and 10 are secured within mixing chamber 7 by the combination of sparging means inlet lines 37 and centering bars 34, 35, and 36, respectively. Generally, it is desirable that the second gas flowing in conduit section 6, before injection of the first gaseous stream, be in turbulent flow, i.e., it has a Reynolds Number ≥ 2100, and preferably greater than about $1 \times 10^5$.

In the modification where the mixing apparatus of the present invention is employed in conjunction with a downstream chemical converter, the overall operation is as follows. Mixed gases leaving mixing zone 7 pass through pipe 25 to reaction zone 26, wherein any suitable thermal or catalytic conversion is effected. The reaction product leaves reaction zone 26 through line 27. A small amount of reaction product flows through sample line 28 to sample sensor system 29, which may consist of any suitable combination of temperature-, pressure-, and/or composition-determining elements. The output from sample sensor system 29 passes through transmitting cable 30 to calibrating control console 31. Depending on the conditions prevailing with reaction zone 26, or the temperature, pressure, and composition of reaction product flowing in line 27, calibrating control console 31 controls the flow of primary gas 1 and purge gas 3 to ring-shaped sparging means 8, 9, and 10.

To control the flow of the first gas to sparging means 8, 9, and/or 10 in the arrangement shown in FIG. 1, a signal is sent from calibrating control console 31 through lines 32 to control valves 15, 16, and/or 17. First gas 1, flowing in manifold 11, is routed to sparging means feed lines 12, 13, and/or 14 and sparging means 8, 9, and/or 10 by the operation of control valves 15, 16, and/or 17, respectively. When conditions within reaction zone 26 dictate, or the temperature, pressure, and/or composition of reaction product flowing in line 27 requires, the activation or deactivation of one or more sparging means, a suitable signal is sent from calibrating control console 31 through control valve lines 33 to control valves 19, 20, and/or 21. Upon such activation or deactivation, purge gas 3, flowing in manifold 18, is routed through control valves 19, 20, and/or 21, purge gas feed lines 22, 23, and/or 24, sparging means feed lines 12, 13, and/or 14 to sparging means 8, 9, and/or 10, respectively.

The particular method of controlling the flow of first and purge gases to sparging means 8, 9, and 10 depicted in FIG. 1 is not critical, and other control schemes will be apparent to those skilled in the art.

Figure 2:
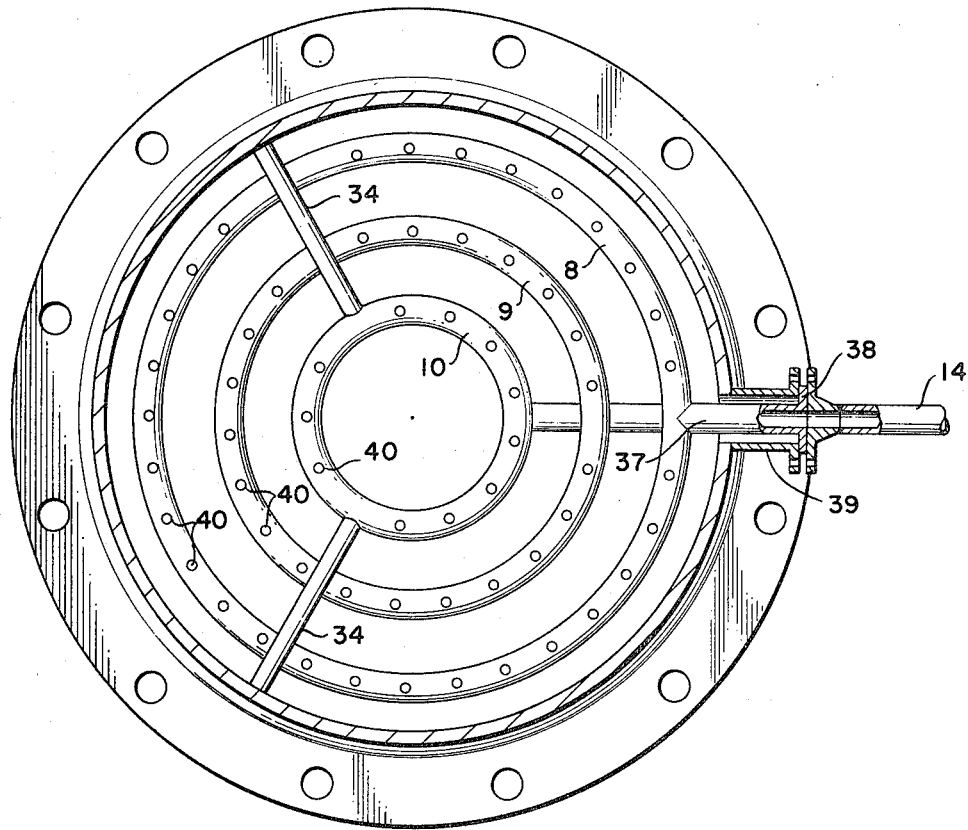
FIG. 2 shows an enlarged partial view, at section 2—2 of FIG. 1, of one sparging means arrangement.

FIG. 2 shows an enlarged partial view, taken at section 2—2 of FIG. 1, of one sparging means arrangement. Sparging means 8, 9, and 10 are concentrically arranged within mixing zone 7. Centering bars 34, along with sparging means inlet line 37 secure sparging means 10 within mixing chamber 7. Similar centering bars and sparging means inlet lines, not shown, similarly hold sparging means 9 and 8, respectively, upstream of sparging means 10, within mixing zone 7. On the downstream surface of sparging means 8, 9, and 10 are a plurality of uniformly distributed orifices 40, through which the first gas is injected into the second gas. The number and arrangement of such orifices on any individual sparging means will depend on the amount, and the variation in that amount, of chemical conversion effected in the downstream chemical reaction zone. The first gas, under relatively steady-state conditions, and purge gas, under conditions of startup and shutdown of the downstream chemical converter, flows through sparging means feed line 14, inlet flange 38 (held in place by sparger mounting nozzle 39), and sparging means inlet line 37 to sparging means 10. Sparging means 9 and 8 are similarly anchored within mixing chamber 7.

EXAMPLE

The performance of an inline mixing apparatus of the present invention was examined in a flow system which consisted of an air compressor for supplying air, suitable manifolding for bypassing some of the air delivered by the compressor, an orifice meter for measuring the flow of air, a 6-inch diameter elbow, the mixing chamber containing at least one ring-shaped sparging means, and a diffuser. The mixing chamber was fabricated from a single 6-inch ID cast acrylic pipe, which was cut into several shorter sections. The sections were interchangeable to suit the type of measurement needed. The inside diameter of the sections varied by only a few thousandths of an inch.

The compressor was capable of delivering 2,000 scfm of air, corresponding to a test section velocity of about 160 ft/sec or a test section Reynolds number ($N_{Re}$) of about $5 \times 10^5$. The test section velocity was varied by by-passing some of the air.

Velocity and static pressure distributions across the diameter of the test section at various distances downstream of the elbow were obtained by means of traversing impact and static pressure probes. Traverses were obtained in the vertical and horizontal planes, and at 45° with the vertical at every two pipe diameters downstream of the elbow. The probe used had an impact hole 0.063 inch in diameter and four static holes 0.025 inch in diameter.

The test ring sparging means were mounted concentrically within the pipe, downstream of the elbow, where measurements indicated that the velocity and static pressure distributions were uniform. The test ring sparging means were fabricated from copper tubing. Two sizes of copper tubing were used and total of four ring-shaped sparging means were prepared. The dimensions of the ring-shaped sparging means are given in Table I.

TABLE I

Dimensions of Ring-Shaped Sparging Means

| Ring diameter | | Orifice | number of |

| Identification | (center-center) | Tube OD | diameter | orifices |
|---|---|---|---|---|
| A | 4" | ¾" | 5/64" | 8 |
| B1 | 4" | ½" | 0.117"ε | 12 |
| B2 | 4" | ½" | 1/16" | 4 |
| C | 1¾ | ½" | 0.0677" | 4 |

Velocity and static pressure profiles were measured at various planes and at various distances downstream of the elbow at an average air velocity of 50 ft/sec, or $n_{Re} = 1.6 \times 10^5$. The flow separated from the inner wall of the bend, as indicated by the much smaller velocity near the inner wall for the velocity profiles in the vertical plane and at a distance of about 2 pipe diameters downstream of the elbow. Vertical traverses right at the outlet of the elbow indicated reverse flow near the wall.

The velocity and pressure profiles for all four planes between 5 and 11 pipe diameters downstream of the elbow were fairly uniform. The maximum percent deviations from the mean velocity at 5 and 7 pipe diameters were ±5 percent and ±2 percent, respectively, over the central core of the pipe. The corresponding deviations from the mean static pressures were ±0.0008 psi and ±0.005 psi, respectively. The velocity of the fluid near the wall was retarded because of wall friction. The boundary layer thickened and gradually encroached on the uniform stream as flow proceeded down the pipe. Since the total mass flux remains constant, the flow in the central core accelerated to compensate for the slower flow near the wall.

Traverses of velocity and static pressure were also taken at an average air velocity of 110 ft/sec and 151 ft/sec, corresponding to Reynolds numbers of about $3.5 \times 10^5$ and $4.8 \times 10^5$, respectively. Profiles at the former were essentially similar to those obtained at $N_{Re} = 1.6 \times 10^5$. Again the velocity and static pressure distributions were fairly uniform between 5 and 11 pipe diameters downstream of the elbow. The maximum percent deviations from the mean were again ±5 percent and ±2 percent at 5 and 7 pipe diameters downstream of the elbow, respectively. The corresponding deviations from the mean static pressures were ±0.003 psi and ±0.002 psi, respectively.

For $N_{Re} = 4.8 \times 10^5$, velocity and static pressure profiles were obtained at 5 and 7 pipe diameters downstream of the elbow. The profiles were fairly uniform and were similar to the corresponding profiles obtained at the same location at the lower Reynolds numbers. The maximum percent deviations from the mean velocity were again ±5 percent and ±2 percent, respectively. The deviations from the mean pressures were ±0.005 psi and ±0.002 psi, respectively.

Orifice back pressure distribution for ring-shaped sparging means A and B1 are tabulated in Table II. The ring spargers were located 5 pipe diameters downstream of the elbow. The base pressure coefficients calculated from the measurements are given in the same table, and are in good agreement with experimentally obtained base pressure coefficients from the literature for a cylinder at the same Reynolds numbers. The differences in the orifice back pressure for a particular ring are quite small and are most probably due to maldistribution in free stream velocity and static pressure.

The quantity of the first gas needed to prevent backflow of the second gas into the sparging means can be estimated from the back pressure measurements. However, this was measured independently by injecting helium through the sparging means and determining the minimum flow required to insure positive flow through all the orifices of the sparging means. This was determined by sampling the gas mixture near the orifices and measuring the concentration by means of a thermal conductivity analyzer. A concentration profile was obtained by moving a sampling probe concentrically with the sparging means diameter near the orifice. Experimentally measured flow of the first gas required to prevent backflow of the second gas into the ring-shaped sparging means are shown in Table II for two different secondary gas velocities.

When two ring-shaped sparging means were mounted adjacent to each other, the average orifice back pressure on the downstream sparger was lower than the average orifice back pressure on the upstream sparger. For sparging means B1 and C, mounted 1, 2, 3, and 4 inches apart, and with sparging means B1 upstream of sparging means C, the average orifice back pressure of means C was less than the average orifice back pressure of means B1. The differences were 0.005, 0.003, 0.004, and 0.004 psi, respectively. These runs corresponded to an air flow of $N_{Re} = 1.6 \times 10^5$ ($Re_d = 1.3 \times 10^4$). The differences were due to the decrease in the static pressure due to drag after the first ring. Assuming the same drag coefficient as in the case of flow around a cylinder (which is 1.2 for $Re_d = 1.3 \times 10^4$), the static pressure drop is ~0.0027 psi plus 0.00066 psi/ft for pipe friction. This is close to the measured values. The higher pressure difference may be due to the blockage effect which increases the effective velocity in the region where the ring spargers are located. The effect appeared to be more pronounced when the two rings were very close to each other.

I claim as my invention:

TABLE II.—PERFORMANCE OF RING-SHAPED SPARGING MEANS

| | Ring-shaped sparging means | | | | |
|---|---|---|---|---|---|
| | A (8 orifices) | | | B1 (4 orifices) | |
| Air velocity in test section | 50 ft./sec. | 110 ft./sec. | 156 ft./sec. | 67 ft./sec. | 100 ft./sec. |
| Reynolds number based on tube diameter of sparging means, $Re_d$ | 2×10⁴ | 4.4×10⁴ | 6.2×10⁴ | 1.8×10⁴ | 2.6×10⁴ |
| Orifice No.: | Back pressure profile, p.s.i. | | | | |
| 1 | 0.0300 | 0.112 | 0.210 | 0.0527 | 0.100 |
| 2 | 0.0307 | 0.122 | 0.210 | 0.0531 | 0.105 |
| 3 | 0.0311 | 0.115 | 0.213 | 0.0535 | 0.101 |
| 4 | 0.0289 | 0.115 | 0.213 | 0.0506 | 0.101 |
| 5 | 0.0292 | 0.114 | 0.213 | | |
| 6 | 0.0292 | 0.114 | 0.207 | | |
| 7 | 0.0292 | 0.115 | 0.213 | | |
| 8 | 0.0285 | 0.115 | 0.210 | | |
| Maximum differences | 0.0026 | 0.010 | 0.006 | 0.0029 | 0.005 |
| Differences calculated based on velocity and static pressure distributions | 0.0036 | 0.015 | 0.025 | 0.0059 | 0.013 |
| Average back pressure coefficient | 1.44 | 1.15 | 1.05 | 1.42 | 1.24 |
| Back pressure coefficient, cylinder (literature, measured) | 1.2 | 1.2 | | | |
| Measured primary gaseous flow, s.c.f.m., to prevent secondary gas backflow | 0.064 | 0.10 | | | 1.2 |

1. The process of rapidly dispersing a first gaseous stream into a second stream in a mixing zone which comprises
   a. conveying the second gaseous stream through a 90° elbow having a radius to diameter ratio of about 1.1,
   b. conveying the second gaseous stream, after passage through the elbow, through a substantially cylindrical conduit having a length of from about 5 to about 7 conduit diameters, whereby substantially uniform velocity and static pressure profiles develop within the second gaseous stream;
   c. injecting the first gaseous stream through uniformly distributed orifices located on the downstream surface of at least one, hollow, ring-shaped sparging means into the second gaseous stream; and
   d. passing the mixed first and second gases from the mixing zone.

2. An inline mixing apparatus for rapidly dispersing a first gaseous stream into a second gaseous stream which consists essentially of a mixing zone containing
   a. at one end of the zone, an inlet for the introduction of the second gaseous stream;
   b. downstream from the inlet, a resistance to the flow of the second gaseous stream, downstream of which is located a length of substantially cylindrical conduit between about 3 and about 11 conduit diameters in length;
   c. downstream of said length of substantially cylindrical conduit, at least one hollow, ring-shaped sparging means for injecting the first gaseous stream into the second gaseous stream; and
   d. an outlet for the resulting mixed first and second gaseous streams downstream from the last sparging means located within said mixing zone.

3. The apparatus of claim 2 wherein the resistance to the flow of the second gas comprises an elbow having a radius to diameter ratio of about 1:1.

4. The apparatus of claim 3 wherein the elbow effects a change in the direction of flow of the second gas of about 90°.

5. The apparatus of claim 4 wherein the ring-shaped sparging means is located about 5 to about 7 conduit diameters downstream of said elbow.

* * * * *